(12) United States Patent
Foraci

(10) Patent No.: US 7,935,189 B2
(45) Date of Patent: May 3, 2011

(54) PROCESS AND PLANT FOR PRODUCING SUGAR PRODUCTS FROM GRAPES

(75) Inventor: Fabio Foraci, Mazara del Vallo (IT)

(73) Assignee: Cantine Foraci S.R.L., Contrada Serroni, Mazara Del Vallo (TP) (IT)

( * ) Notice: Subject to any disclaimer, the term of this patent is extended or adjusted under 35 U.S.C. 154(b) by 785 days.

(21) Appl. No.: 11/821,454

(22) Filed: Jun. 21, 2007

(65) Prior Publication Data

US 2008/0314379 A1 Dec. 25, 2008

(51) Int. Cl.
  B01D 15/08 (2006.01)
  A23L 2/08 (2006.01)
  C12G 1/02 (2006.01)
  C13D 3/14 (2006.01)

(52) U.S. Cl. ........... 127/9; 127/46.2; 210/264; 210/670; 426/270; 426/330.1; 426/599

(58) Field of Classification Search .................. 426/271, 426/330.5, 599; 210/670, 264; 127/9, 46.2
See application file for complete search history.

(56) References Cited

U.S. PATENT DOCUMENTS

| 3,416,961 A | 12/1968 | Mountford et al. ......... 127/46.2 |
| 4,443,267 A | 4/1984 | Pansolli et al. .............. 127/46.2 |
| 5,106,638 A * | 4/1992 | Siegers ......................... 426/271 |
| 6,325,940 B1 | 12/2001 | Ikeda ............................ 210/659 |

FOREIGN PATENT DOCUMENTS

| DE | 25 32 325 A1 | 2/1977 |
| EP | 0 609 279 A | 8/1994 |
| EP | 0 910 448 A | 4/1999 |
| EP | 1 096 006 A | 5/2001 |
| EP | 1734108 A1 * | 12/2006 |
| GB | 1 492 992 A | 11/1977 |

* cited by examiner

Primary Examiner — David A Reifsnyder
(74) Attorney, Agent, or Firm — Ladas & Parry, LLP

(57) ABSTRACT

A process for producing sugar products from grapes includes treating a solution of liquid rectified concentrated must by chromatography, to separate at least one sugar contained in it. A plant for producing sugar products from grapes comprises a plurality of columns connected together in series, each column implementing in succession all steps of the chromatographic process, but implementing steps of the process which are different from the other columns. A recirculation step is provided in passing from one step to the next.

21 Claims, 4 Drawing Sheets

PROCESS AND PLANT FOR PRODUCING SUGAR PRODUCTS FROM GRAPES

FIELD

The present disclosure relates to a process and plant for producing sugar products from grapes.

In particular, it relates to a process and plant for producing rectified concentrated must or rectified concentrated juice in crystalline or powder form.

BACKGROUND

Grapes are known to internally contain sugars, in particular glucose and fructose.

It has long been known to extract from grapes an aqueous mixture formed from water, fructose and glucose, and known as rectified concentrated must.

It is also known to process this mixture to form rectified concentrated must in crystalline or powder form.

Discussion of the Related Art

In particular, Italian patent application RM99A000662 describes a process in which the liquid rectified concentrated must is initially concentrated to a concentration of 82° brix and then mixed with neutral 96° ethyl alcohol, in the proportion of 1:1 (i.e. 50% ethyl alcohol and 50% liquid rectified concentrated must).

The mixture of ethyl alcohol and liquid rectified concentrated must is stirred to enable the ethyl alcohol to extract the water contained within the sugars.

This operation results in separation into a lower layer of pasty grape sugar and an upper layer of ethyl alcohol and water.

The mixture of water and ethyl alcohol is then removed and distilled (to recover the ethyl alcohol) while the pasty matter is kept for at least 15 days at a temperature of −5/6° C. for crystal formation.

After the time required for crystal formation (at least 15 days) the crystals are centrifuged, washed and maintained in a dryer to obtain the final product. The final product obtained does not present a true crystalline or powder structure, but instead is in the form of a gelatinous mass, consisting of: glucose and fructose sugars (and other minimal quantities of substances present in the grape defined as "non-sugar"), ethyl alcohol and water.

In this respect, the ethyl alcohol removes only part of the water, the final drying not being able to eliminate the remainder of the water, which therefore remains incorporated in the interior of the gelatinous mass without being able to emerge from it.

The gelatinous mass is also unstable in air and difficult to work.

Another drawback is the high cost of the ethyl alcohol, both at the purchase stage and in its recovery; this evidently affects the cost of the final product.

The crystal maturing time is very lengthy and usually varies considerably depending on the particular conditions under which it takes place, this leading to difficult industrialization of the process.

In addition, crystal washing inevitably modifies the fructose/glucose weight ratio because of the greater water solubility of fructose compared with glucose.

To rebalance this ratio an attempt has been made to enrich the starting solution concentrated to 82° brix with the fructose recovered from the wash water and reconcentrated.

However the finished product obtained is unsatisfactory in terms of its dryness, taste and smell.

SUMMARY

The technical aim of the present disclosure is therefore to provide a process and plant for producing sugar products from grapes by which the technical drawbacks of the known art are eliminated.

Within the scope of this technical aim, an object of the disclosure is to provide a process and plant which enable a crystalline or powder product to be obtained rather than a gelatinous mass.

In particular, the process of the present disclosure enables the water to be removed from the gelatinous mass very efficiently.

Another object is to provide a process and plant enabling a finished product to be obtained which is stable in air and easily worked.

A further object is to provide a process and plant which do not require the use of ethyl alcohol, in this manner enabling the costs associated therewith to be substantially reduced.

Another object is to provide a process and plant which can be easily industrialized.

A further object is to provide a process and plant enabling a finished product to be obtained which presents satisfactory characteristics in terms of dryness, taste and smell.

The technical aim, together with these and further objects, are attained, according to the invention, by a process and plant for producing sugar products from grapes in accordance with the accompanying claims.

BRIEF DESCRIPTION OF THE DRAWINGS

Further characteristics and advantages of the invention will be more apparent from the description of a preferred but non-exclusive embodiment of the process and plant for producing sugar products from grapes according to the invention, illustrated by way of non-limiting example in the accompanying drawings, in which.

DETAILED DESCRIPTION

Figure 1:
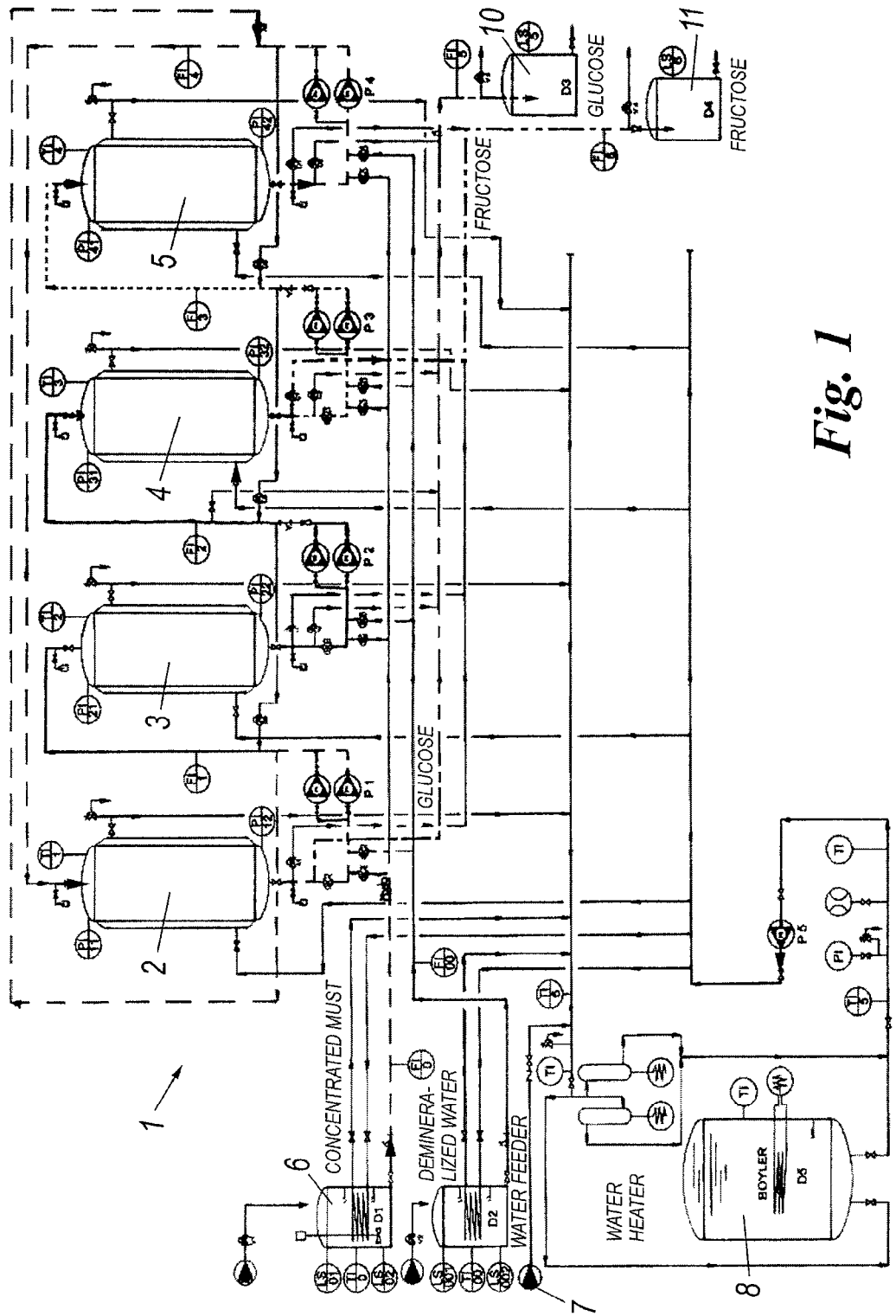
FIGS. 1-4 show the plant of the invention in four different stages of operation.

Said figures show a plant for producing sugar products from grape, indicated overall by the reference numeral 1.

The plant 1 comprises a plurality of columns 2, 3, 4, 5, connected together in series, each of the columns 2, 3, 4, 5 implementing in succession all the steps of the chromatographic process, but implementing steps of the process which are different from the other columns 2, 3, 4, 5.

Hence in practice, when one of the columns (for example the column 2) is in a predetermined stage of the chromatographic process, column 3 is in a different stage, column 4 in a still different stage, and column 4 in a further stage different from all the preceding stages.

Each column opportunely effects all the steps of the chromatographic process, a recirculation step being provided for passing from one step to the next.

Specifically, as shown in the figures, the plant comprises four columns which implement a glucose concentration step, a glucose stripping step, a fructose enrichment step and a fructose concentration step.

In addition to the columns, the plant is provided with connection lines, a concentration must tank 6, a make-up water feeder 7 and a water heater 8 for heating the water to a predetermined temperature for the process.

The plant is also provided with a glucose accumulation tank 10 and a fructose accumulation tank 11.

The plant operation is evident from that described and illustrated, and is substantially the following.

In FIG. 1, column 2 is shown in the absorption stage (for concentrating the glucose) and is fed with a fraction rich in glucose and fructose originating from column 5 (as indicated by the dashed line).

A glucose-rich fraction is withdrawn from the bottom of column 2 and is fed to the glucose tank 10 (dashed and dotted line).

Column 3 is in the purification stage (to implement glucose stripping), and is at rest, without feed or discharge.

Column 4 is in the desorption stage (i.e. fructose enrichment), and is fed with water (full line), which is used to displace the glucose fraction contained in it (column 4).

The fructose fraction is withdrawn from the bottom of column 4 and is fed to the tank 11 (dashed and double dotted line); however not all the fructose is withdrawn, hence part of the fructose is fed to the next column 5 (circled line).

Column 5 is in the concentration stage (the fructose is concentrated therein), in which it (column 5) is fed with the residual fraction of column 4 still rich in fructose (circled line), its bottoms, together with fresh must, being fed to column 1 (dashed line).

This configuration is maintained by the plant for 6 minutes and 30 seconds (six and a half minutes).

Figure 2:
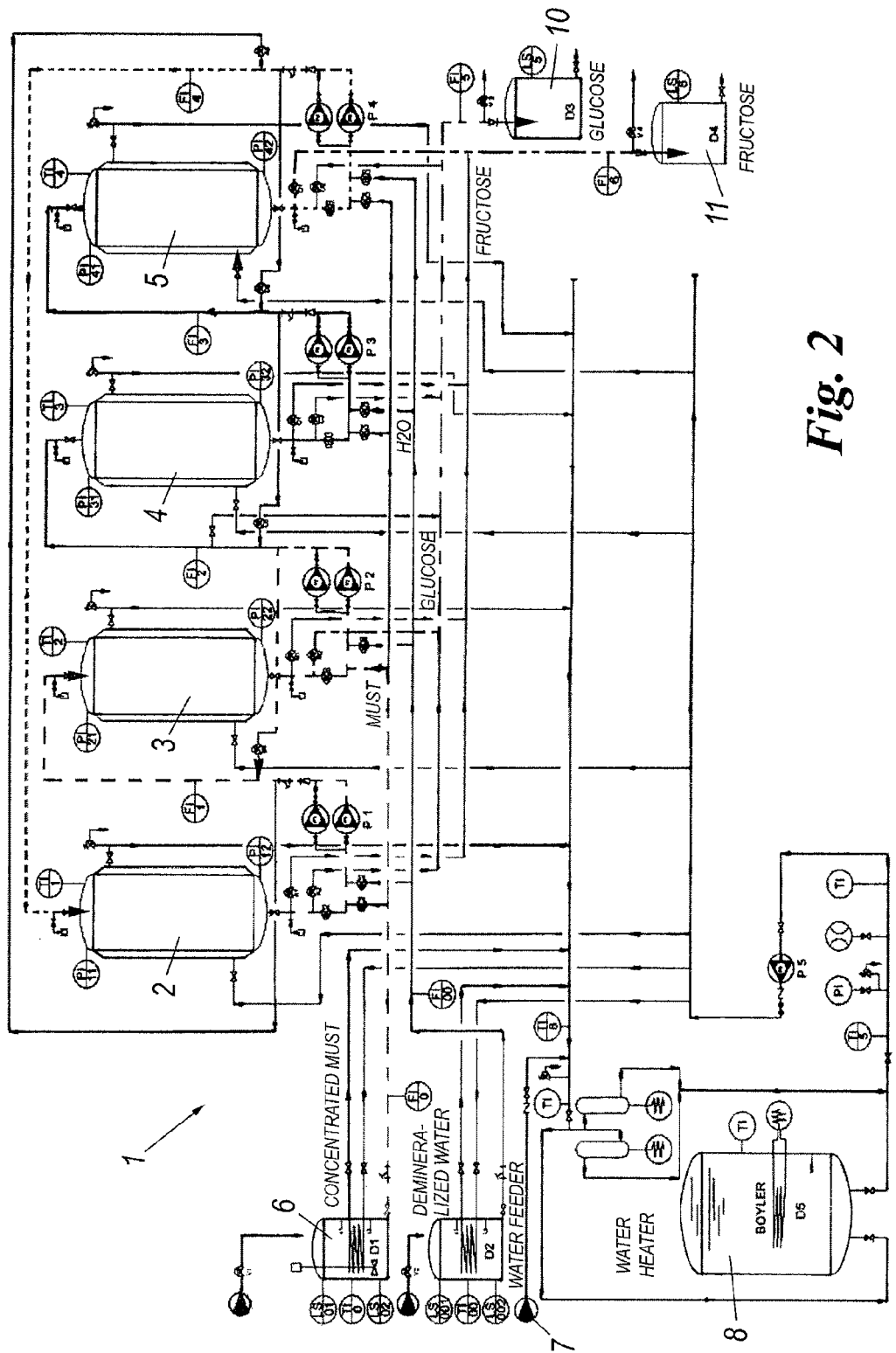

After a recirculation step of 19 minutes, the plant then assumes the configuration of FIG. 2.

In this configuration, column 2 is in the concentration stage, it (column 2) being fed with the residual fraction from column 5 still rich in fructose (circled line), the bottoms from this column, together with fresh must, being fed to column 3 (dashed line).

Column 3 is in the absorption stage, in which it is fed with the fraction rich in glucose and fructose originating from column 2 and with concentrated must (dashed line); a glucose-rich fraction is withdrawn from the bottom of column 3 and fed to the tank (dashed and dotted line).

Column 4 is in the purification stage and is a rest, without feed or discharge.

Column 5 is in the desorption stage, and is fed with water (to displace the fructose fraction contained in it, full line), the fructose fraction being withdrawn from its bottom and fed to the tank 11 (dashed and double dotted line), the unextracted fructose being fed to column 2 (circled line).

This configuration is maintained by the plant for 6 minutes and 30 seconds (six and a half minutes).

Figure 3:
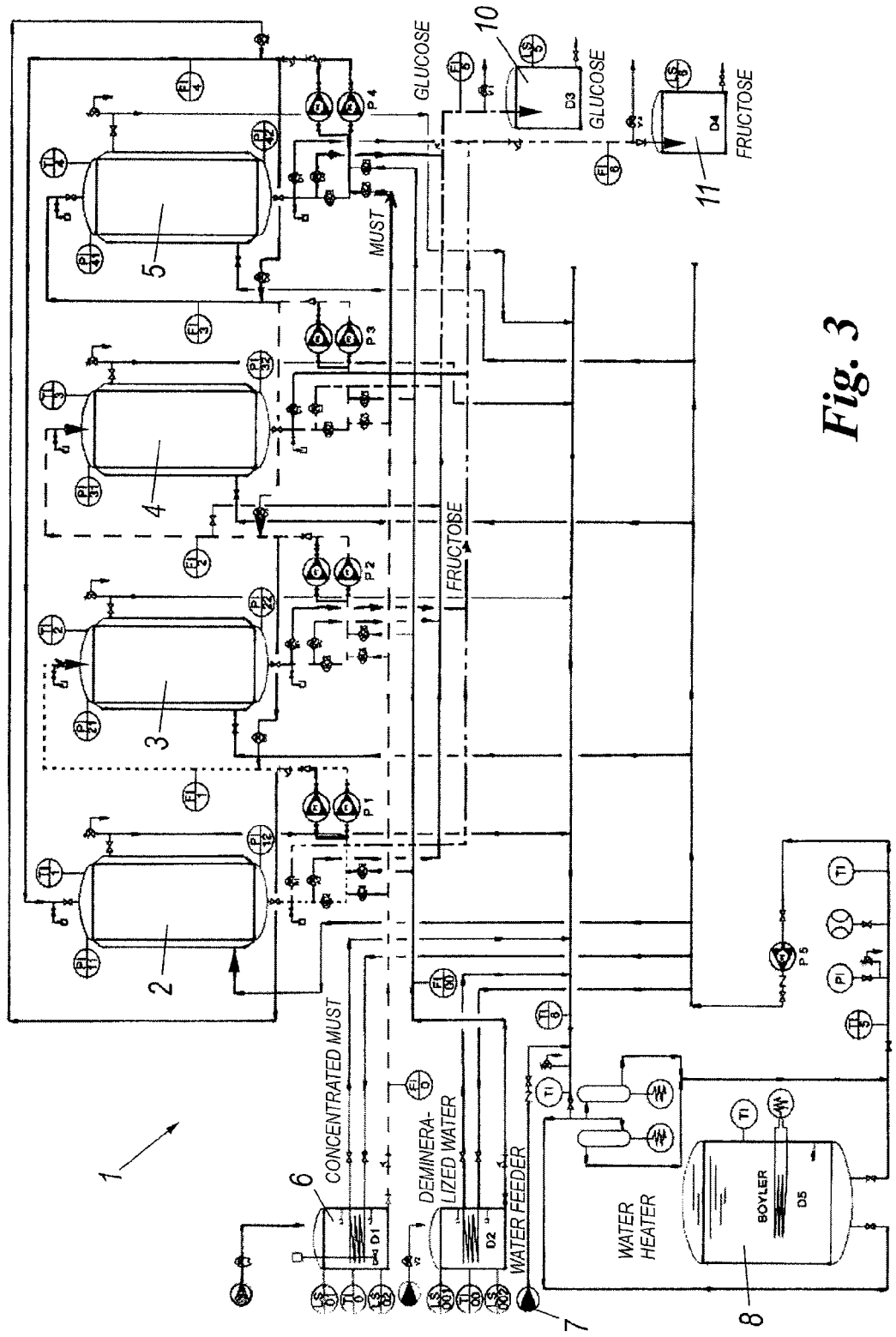

After a recirculation step of 19 minutes, the plant then assumes the configuration of FIG. 3.

Column 2 is in the desorption stage, and is fed with water (to displace the fructose fraction contained in it, full line), the fructose fraction being withdrawn from its bottom and fed to the tank 11 (dashed and double dotted line), the unextracted fructose being fed to column 3 (circled line).

Column 3 is in the concentration stage, in which it (column 3) is fed with the residual fraction of column 2 still rich in fructose (circled line), its bottoms, together with fresh must, being fed to column 4 (dashed line).

Column 4 is in the absorption stage, in which it is fed with the fraction rich in glucose and fructose originating from column 3 and with concentrated must (dashed line); a glucose-rich fraction is withdrawn from the bottom of column 4 and fed to the tank (dashed and dotted line).

Column 5 is in the purification stage and is a rest, without feed or discharge.

This configuration is maintained by the plant for 6 minutes and 30 seconds (six and a half minutes).

Figure 4:
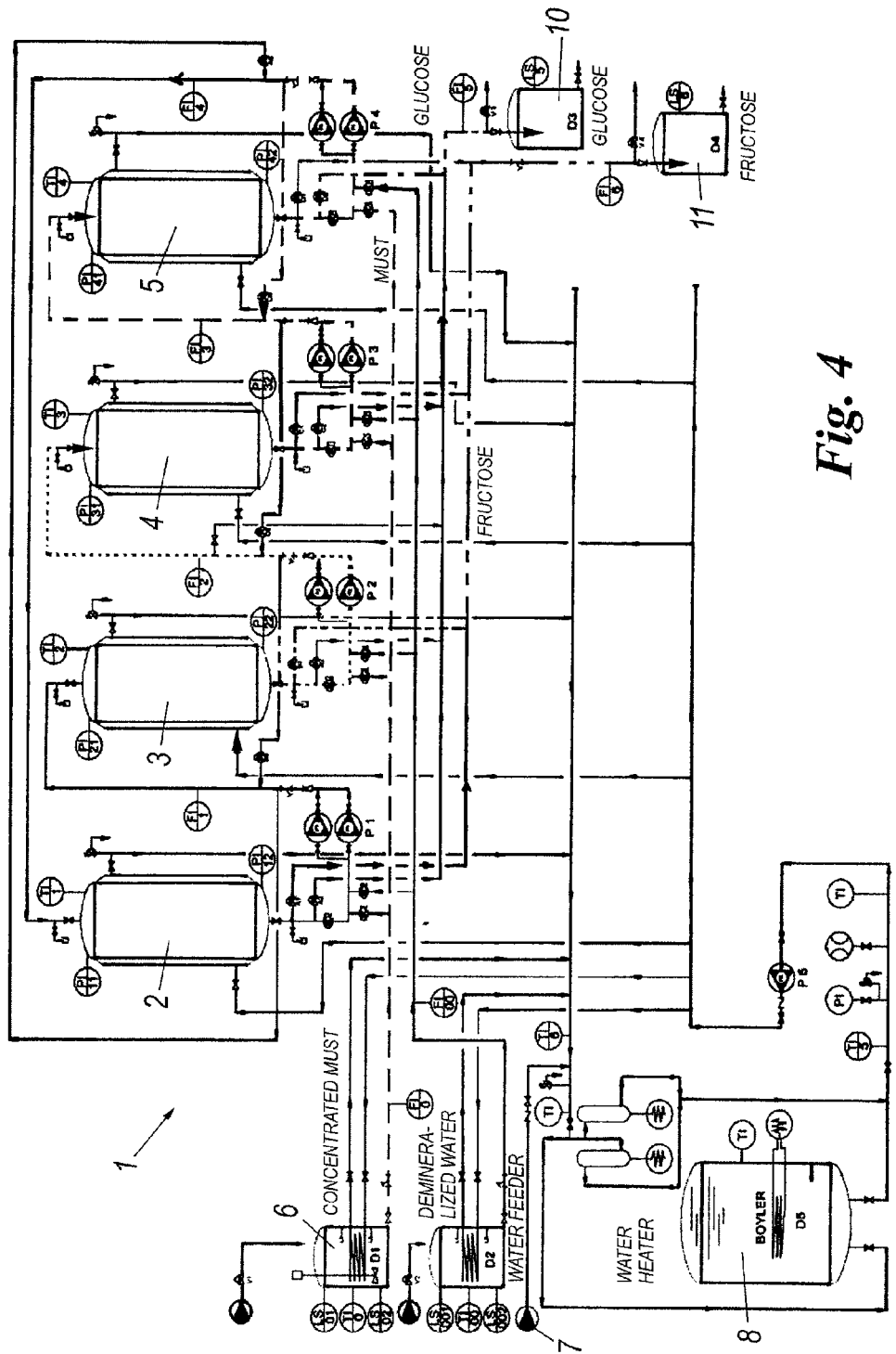

After a recirculation step of 19 minutes, the plant then assumes the configuration of FIG. 4.

Column 2 is in the purification stage and is a rest, without feed or discharge.

Column 3 is in the desorption stage, and is fed with water (to displace the fructose fraction contained in it, full line), the fructose fraction being withdrawn from its bottom and fed to the tank 11 (dashed and double dotted line), the unextracted fructose being fed to column 4 (circled line).

Column 4 is in the concentration stage, in which it is fed with the residual fraction of column 3 still rich in fructose (circled line), the bottoms of column 4, together with fresh must, being fed to column 5 (dashed line).

Column 5 is in the absorption stage, in which it is fed with the fraction rich in glucose and fructose originating from column 4 and with concentrated must (dashed line); a glucose-rich fraction is withdrawn from the bottom of column 5 and fed to the tank (dashed and dotted line).

This configuration is maintained by the plant for 6 minutes and 30 seconds (six and a half minutes).

After a further recirculation step of 19 minutes, the plant again assumes the configuration of FIG. 1.

The described plant implements a process for producing sugar products from grapes.

The process consists of treating a solution of liquid rectified concentrated must by chromatography, to separate at least one sugar contained in it.

The liquid rectified concentrated must used for separating the sugars has a concentration of 65° brix before treatment, i.e. before being fed to the columns 2-4.

The separated sugars comprise a liquid solution of glucose and a liquid solution of fructose.

At least one of these obtained sugars is then separated from the liquid solution containing it, this separation being achieved by crystallization in the metastable region of the treated liquid solution (i.e. of the glucose and/or fructose liquid solution).

The fructose crystallization comprises the steps of concentrating the liquid solution of fructose, possible seeding with fructose crystals (to limit crystallization time), cooling, fructose crystal growth, and crystal separation from the liquid solution.

Advantageously, during the concentration step the liquid solution is brought to a concentration of 80-84° brix.

Any subsequent seeding is carried out by adding fructose crystals of less than 0.15 millimeter in size to the liquid solution in a quantity of 0.95-5.00 wt %.

Cooling is carried out by cooling the liquid solution to a temperature of 10-15° C., separation being by centrifuge.

For example the fructose solution is brought to 82° brix at a temperature of 12° C., and seeding is carried out with 1% of crystals.

Drying of the crystals obtained (in a static dryer under vacuum) presented no difficulty, the crystals being stable at ambient temperature under humidity conditions of near or greater than 60%.

The glucose separation comprises the steps of concentrating the liquid solution of glucose, cooling and granulating the glucose, and drying the glucose.

The concentration of the liquid solution of glucose is brought suitably to 68-82° brix, and preferably to 70-74° brix.

Cooling is carried out to a temperature of 10-15° C. and preferably to 11-13° C., granulation being simultaneous with cooling.

Advantageously, the mixture is stirred during cooling, granulation and drying under vacuum.

For example, the glucose mixture has been concentrated to 72° brix and then brought to a temperature of 12° C.

The glucose obtained in this manner does not present a crystalline structure, is easily dried in a static dryer and has the form of a powder.

Finally, the glucose separated from its liquid mixture and the fructose separated from its liquid mixture are advantageously mixed together to form the rectified concentrated must in crystalline or powder form.

It has been found in practice that the process and plant for producing sugar products from grapes according to the invention are particularly advantageous, because they enable rectified concentrated must to be obtained in crystalline or powder form of very high quality.

The process and plant for producing sugar products from grapes conceived in this manner are susceptible to numerous modifications and variants, all falling within the scope of the inventive concept; moreover all details can be replaced by technically equivalent elements.

What I claim is:

1. A process for producing sugar products from grapes comprising: treating a solution of liquid rectified concentrated must by chromatography, to separate at least one sugar contained in the liquid concentrated must, wherein the liquid concentrated must used for separating the at least one sugar has a concentration of approximately 65° brix.

2. The process of claim 1, wherein the separated at least one sugar comprises glucose in a liquid solution of glucose and fructose in a liquid solution of fructose.

3. The process of claim 2; further comprising: separating the glucose from the liquid solution of glucose and/or the fructose from the liquid solution of fructose.

4. The process of claim 3, wherein separation is carried out by crystallization preferably within the metastable region of the treated liquid solution.

5. The process of claim 4, wherein crystallization of the fructose comprises the steps of concentrating the liquid solution of fructose, cooling, fructose crystal growth, and crystal separation from the liquid solution.

6. The process of claim 5, further comprising a step of seeding with fructose crystals between the concentration step and the cooling step.

7. The process of claim 6, wherein seeding is carried out by adding fructose crystals to the liquid solution in a quantity of 0.95-5 wt %.

8. The process of claim 6, wherein seeding is carried out by adding to the liquid solution fructose crystals of less than 0.15 millimeter in size.

9. The process of claim 6, wherein in the concentration step, the liquid solution is brought to a concentration of 80-84° brix.

10. The process of claim 5, wherein in the concentration step, the liquid solution is brought to a concentration of 80-84° brix.

11. The process of claim 5, wherein cooling is carried out by cooling the liquid solution to a temperature of 10-15° C.

12. The process of claim 5, wherein the separation is of centrifugal type.

13. The process of claim 3, wherein glucose separation comprises the steps of concentrating the liquid solution of glucose, cooling and granulating the glucose, and drying the glucose.

14. The process of claim 13, wherein in the concentration step, the liquid solution of glucose is brought to a concentration of 68-82° brix.

15. The process of claim 14, wherein in the concentration step, the liquid solution of glucose is brought to a concentration of 70-74° brix.

16. The process of claim 13, wherein cooling is carried out at a temperature of 10-15° C.

17. The process of claim 16, wherein cooling is carried out at a temperature of 11-13° C.

18. The process of claim 13, wherein granulation is simultaneous with cooling.

19. The process of claim 13, further stirring the mixture during cooling and granulation.

20. The process of claim 13, wherein drying takes place under vacuum.

21. The process of claim 3, further comprising mixing together the glucose separated from its liquid mixture and the fructose separated from its liquid mixture.

* * * * *